United States Patent
Ju

(10) Patent No.: US 10,210,253 B2
(45) Date of Patent: Feb. 19, 2019

(54) APPARATUS OF PROVIDING COMMENTS AND STATISTICAL INFORMATION FOR EACH SECTION OF VIDEO CONTENTS AND THE METHOD THEREOF

(71) Applicant: Hyun Sun Ju, Seongnam-si (KR)

(72) Inventor: Hyun Sun Ju, Seongnam-si (KR)

(73) Assignee: VEAVER, INC. (KR)

( * ) Notice: Subject to any disclaimer, the term of this patent is extended or adjusted under 35 U.S.C. 154(b) by 292 days.

(21) Appl. No.: 14/907,815

(22) PCT Filed: Jul. 23, 2014

(86) PCT No.: PCT/KR2014/006677
§ 371 (c)(1),
(2) Date: Jan. 26, 2016

(87) PCT Pub. No.: WO2015/012580
PCT Pub. Date: Jan. 29, 2015

(65) Prior Publication Data
US 2016/0171003 A1    Jun. 16, 2016

(30) Foreign Application Priority Data
Jul. 26, 2013 (KR) ........................ 10-2013-0088825

(51) Int. Cl.
*G06F 17/30*    (2006.01)
*G06F 3/0482*   (2013.01)
(Continued)

(52) U.S. Cl.
CPC ........ *G06F 17/3082* (2013.01); *G06F 3/0482* (2013.01); *G06F 3/04842* (2013.01);
(Continued)

(58) Field of Classification Search
CPC .............. G06F 3/0482; G06F 3/04842; G06F 17/3082; H04L 65/60
See application file for complete search history.

(56) References Cited

U.S. PATENT DOCUMENTS 6,640,044 B2 * 10/2003 Greenwood ......... G11B 27/034
386/278
2004/0059783 A1 * 3/2004 Kazui ............... G06F 17/30817
709/205

(Continued)

FOREIGN PATENT DOCUMENTS

| KR | 20100042342 A | 4/2010 |
|----|---------------|--------|
| KR | 20100100405 A | 9/2010 |

(Continued)

*Primary Examiner* — William L Bashore
*Assistant Examiner* — Gregory A Distefano
(74) *Attorney, Agent, or Firm* — Renaissance IP Law Group LLP

(57) ABSTRACT

The present invention relates to an apparatus of providing comments and statistical information for each section of a video content and the method thereof, the apparatus and the method thereof being capable of writing and displaying replies for each section of the video content which is edited section by section and providing a user interface which plays each section of the video content respectively, so as to allow a user to access the video content section by section in order to easily grasp the characteristics of the corresponding video and to intuitively search fast and play the wanted parts (or sections) of the video.

11 Claims, 6 Drawing Sheets

(51) Int. Cl.
  *G06F 3/0484* (2013.01)
  *H04L 29/06* (2006.01)
  *G06Q 10/10* (2012.01)

(52) U.S. Cl.
  CPC ......... *G06Q 10/10* (2013.01); *H04L 65/4015* (2013.01); *H04L 65/4084* (2013.01); *H04L 65/60* (2013.01); *H04L 65/605* (2013.01)

(56) References Cited

U.S. PATENT DOCUMENTS

| | | | | |
|---|---|---|---|---|
| 2009/0265737 | A1* | 10/2009 | Issa | G06F 17/30817 |
| | | | | 725/38 |
| 2009/0293079 | A1* | 11/2009 | McKee | G06Q 10/105 |
| | | | | 725/10 |
| 2011/0040760 | A1* | 2/2011 | Fleischman | G06Q 30/02 |
| | | | | 707/737 |
| 2013/0205197 | A1* | 8/2013 | O'Neill | G06Q 10/10 |
| | | | | 715/236 |
| 2013/0305283 | A1* | 11/2013 | Yoon | H04N 21/4722 |
| | | | | 725/37 |

FOREIGN PATENT DOCUMENTS

| | | |
|---|---|---|
| KR | 20100111907 A | 10/2010 |
| KR | 20100117943 A | 11/2010 |
| KR | 20110007383 A | 1/2011 |
| KR | 20110033646 A | 3/2011 |
| KR | 20120101212 A | 9/2012 |
| KR | 20130029607 A | 3/2013 |

* cited by examiner (a) Providing statistical graph for the number of comments for each section (b) Providing statistical graph for total number of comments for each section and times (c) Providing statistical graph for total number of comments for each times

APPARATUS OF PROVIDING COMMENTS AND STATISTICAL INFORMATION FOR EACH SECTION OF VIDEO CONTENTS AND THE METHOD THEREOF

FIELD OF THE INVENTION

The present invention relates to an apparatus of providing comments and statistical information for each section of a video content and the method thereof, more specifically, the apparatus and the method thereof being capable of writing and displaying replies for each section of a video content which is edited section by section and providing a user interface which plays each section of the video content respectively, so as to allow a user to access the video content section by section in order to easily grasp the characteristics of the corresponding video and to intuitively search fast and play the wanted parts (or sections) of the video.

BACKGROUND OF THE INVENTION

As the above reply becomes a means for discussion and sharing information among the internet users, the 'reply culture' is a new cultural trend. In particular, the reply has a bilateral nature in that one can post his own opinion to a post and then another user can post different opinion to the original post or to other user's opinion previously posted; because of this attribute of reply, the reply is widely used in sharing information and exchanging opinions on specific issues. In addition, once users write diverse opinions with reply after reading news articles or posts, the opinions can be another source of information in addition to the original article or post. For example, one can comprehend the content and users' assessment of the original article or post without reading the original text; and the concern of users on the article can be grasped by the number of replies regardless of the content of replies.

While the reply culture was originally started and developed with text post, it is also applied to video contents as the web sites, which provide watching video contents online such as movie, music video, and internet lecture using communications networks, are extensively used and users watch various video contents anytime anywhere.

However, when users watching the same video contents want to have a conversation or exchange opinions one another, compared with text that can be read by users at once, the use of reply culture in video contents has a problem that the effect of the above reply function is depreciated because users require watching the video content while playing it to the end. For example, if a reply regarding a video content is posted, other users can hardly know the part of the video content referred by the reply; even if a reply comments a specific part of the video, the specific part can be confirmed by playing the corresponding video content one after another because the video content is not divided as sections. Considering the problems described above, technologies that allow posting a reply at a specified time are being developed.

Hereinafter, the prior art that allow posting a reply at a specified time and related problems are described as follows.

1. Korea disclosed patent No. 2010-0100405 (Sep. 15, 2010): it enables a user to write a reply directly on the playback screen while playing a video and other user can see the inserted reply and write additional reply. But this method provides watching different replies of other users at each time of playback like subtitles and thus it is far from identifying the video based on the content of reply or number of replies.

2. Korea disclosed patent No. 2012-0101212 (Sep. 13, 2012): users write reply at a specific point of time during the playback of a video and the record for replies is provided; if a user selects a specific reply, the video on the timeline of writing the reply is played. However, it is only for playing the video at the time of writing the reply and if a user want to identify the content of the video it is required to play the video.

In addition, as the web sites providing video service increases, competition among the web sites becomes more intensified; considering the circumstances, the web sites providing video service are required to develop new additional services other than the basic service providing videos only in order to get users' interest actively.

SUMMARY OF THE INVENTION

The present invention has been devised to solve the problems as described above by providing an apparatus of providing comments and statistical information for each section of a video content and the method thereof, which provide an interface for editing in detail each section of a video contents consisting of the original video file and the data file containing cue-points and section grouping information and an interface for playing the sections of the video contents according to replies.

In addition, the present invention relates to of providing comments and statistical information for each section of a video content and the method thereof, which generate and provide various types of statistical information based on reply information for each section and information by other assessing methods for video (e.g. recommendation, like, score, and etc.) for users so as to easily grasp the characteristics of the corresponding information.

In addition, the present invention relates to of providing comments and statistical information for each section of a video content and the method thereof, which allow video contents producers to edit each section of the video and display script for each section of the edited video and reply statistical information for each section together for users so as to intuitively search fast and play the wanted parts (or sections) of the video.

In accordance with an aspect of the present invention, the apparatus of providing comments and statistical information for each section of a video content comprises an interface part for editing each section of a video, reply, and playback; enables writing and displaying replies for each section of the video content divided by sections and provides statistical information on replies for each section for users so as to easily search and play a specific section of the video. In addition, the said interface part comprises a video contents editing interface; a reply interface; and a video contents playback interface; the said database comprises a video database; a data file database; and a reply database; and the said database comprises utilizing at least one of an internal storage, an external storage, a virtualized storage in a cloud computing network connected with the network, or combinations thereof; the said video content divided by sections comprises the source video file and the data file containing additional editing information and the video is played section by section using the said data file; the said integrated processing part comprises an editing processing part; a reply processing part; and a playback processing part; the said editing processing part comprises at least one of cue-point insertion information, section grouping information, a script including simple explanation for each section of the video, or combinations thereof; the said reply processing part inserts and prints out replies for each section and extracts statistical information for each section; the said playback processing part plays the video content divided by sections and plays the corresponding sections of the video according the replies.

In addition, in accordance with an aspect of the present invention, the method of providing comments and statistical information for each section of a video content comprises a phase for inputting reply information for each section; a phase for processing replies for each section and statistical information; a phase for outputting replies for each section and statistical information; and a phase for saving the said processed results into database; enables writing replies for each section of the video content divided by sections and provides statistical information on replies for each section for users so as to easily search and play a specific section of the video. In addition, the said method comprises further a phase for playing sections; the said database comprises a video database; a data file database; and a reply database; and the said database comprises utilizing at least one of an internal storage, an external storage, a virtualized storage in a cloud computing network connected with the network, or combinations thereof; the said video content divided by sections comprises the source video file and the data file containing additional editing information and the video is played section by section using the said data file; the said data file comprises at least one of cue-point insertion information, section grouping information, a script including simple explanation for each section of the video, or combinations thereof.

The present invention relates to an apparatus of providing comments and statistical information for each section of a video content and the method thereof, which provide an interface for editing each section of a video contents consisting of the original video file and the data file containing cue-points and section grouping information; an interface for writing replies for each section of the video content; an interface for providing statistical information based on reply information for each section and information by other assessing methods for video; and an interface for playing each section of the video; and additionally allow video contents producers to edit each section of the video and display script for each section of the edited video together in the interface for providing statistical information for each section of the video so as to allow a user to access the video content section by section in order to easily grasp the characteristics of the corresponding video and to intuitively search fast and play the wanted parts (or sections) of the video.

DETAILED DESCRIPTION OF THE PREFERRED EMBODIMENTS

Hereinafter, an embodiment of the apparatus of providing comments and statistical information for each section of a video content and the method thereof in accordance with the present invention will be described with reference to the accompanying figures.

Figure 1:
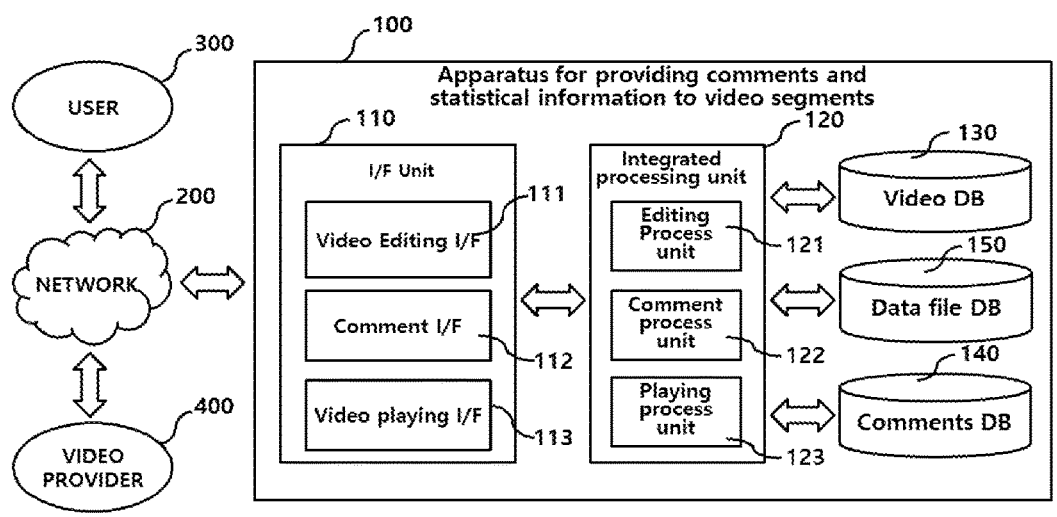
FIG. 1 is an exemplary diagram for explaining the structure of an apparatus of providing comments and statistical information for each section of a video content in accordance with an embodiment of the present invention.

FIG. 1 is an exemplary diagram for explaining the structure of an apparatus of providing comments and statistical information for each section of a video content in accordance with an embodiment of the present invention.

As shown in FIG. 1, the apparatus of providing comments and statistical information for each section of a video content (100) comprises an interface (I/F) part (110), an integrated processing part (120), a video database (DB) (130), a reply DB (140), a data file database (150), and is connected with a user (300) and a video contents provider (400) via a communications network (200). Note that the said video contents provider (400) may be a user among the users making use of the apparatus in the present invention or the service provider of the present invention.

The said interface part (110) comprises a video editing interface (111) for allowing the video contents provider to edit each section of the video, a reply interface (112) for allowing users to write a reply for each section of the video and print out the reply, a video playback interface (113) for allowing users to play the entire video contents or to access the video content section by section and play the corresponding sections. The functions of each interface are described later in more detail with reference to FIG. 2, FIG. 3, and FIG. 4.

The said integrated processing part (120) comprises an editing processing part (121) in which the video contents provider edits video contents with the video editing interface (111) and stores the edited video contents in the video database (130) and the data file database (150); a reply processing part (122) which enters various information including the reply that users write with the reply interface (112) to the reply database (140), and extracts and displays the statistical information for each section of the video in the video playback interface (113) by processing the video information and reply information inputted in this way; and a playback processing part (123) which provides users with the corresponding sections of the video retrieved from the video database (130) for each reply and each statistical data via the said video playback interface (113).

The said video database (130) is a storage unit for the original video files; the reply database (140) stores a reply file saving together the content of reply and the section information of the video to which the reply is written; the data file database (150) is a storage unit for the section information of the original video and the data file containing the editing information.

The said video database (130), the said reply database (140), and the said data file database (150) mean typically an internal or an external memory as a local storage, in the present invention it includes further a virtualized storage for video data backup in a cloud computing network connected with the network (in short, cloud storage). For example, the said cloud storage further includes private cloud storage that the service provider offers or free cloud storage (or network HDD) that portal sites (e.g. Naver, Daum, etc.) offer. That is, the said video database (130) and the said reply database (140) are databases connected to the said integrated processing part (120) via electric or optic cable, a network including cloud computing, or combinations thereof.

For reference, each configuration means for comprising the apparatus of providing comments and statistical information for each section of a video content in the above embodiment of the present invention is described only for the convenience of explanation; in fact all of the operations may be processed in any of the configuration and the means may be broke down to more diversified means or be provided with combinations of the configuration means. In addition, the conventional configuration used in providing users with video contents via a communications network is not required necessarily to explain the present invention and thus omitted.

Figure 2:
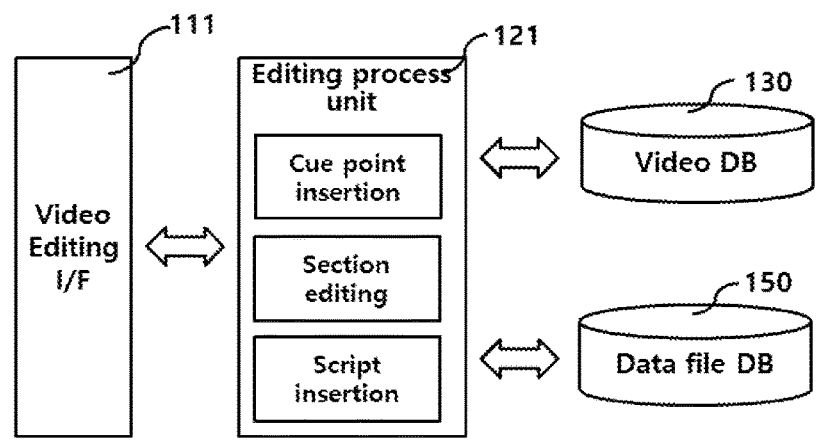
FIG. 2 is an exemplary diagram for explaining the functions provided by the video contents editing interface of an apparatus of providing comments and statistical information for each section of a video content in accordance with an embodiment of the present invention.

FIG. 2 is an exemplary diagram for explaining the functions provided by the video contents editing interface of an apparatus of providing comments and statistical information for each section of a video content in accordance with an embodiment of the present invention.

As shown in FIG. 2, the said video editing interface (111) is an interface in which users can play the video section by section and write a reply with the said editing processing part (121) and the video contents provider (400) edits video contents to display script and reply statistical information for each section. The method of editing each section of the video uses the section by section playback of the original video file using the data file containing cue-point insertion information and section grouping information rather than editing the original video directly. That is in the present invention, the video contents provided to a user comprise the original video file and the data file related with the editing information of the video.

The said data file comprises cue-point information inserted in the video file and section grouping information that groups sections of the video file periodically or non-periodically based on the said inserted cue-points; using the said information the video content is played section by section to users. Each section of video provided in the user interface is played by the corresponding section of the entire video file using the data file rather than playing the actual divided section.

Note that the insertion of cue-points means to create a data segment of key frames between the video images at the closest point in time that a user specified and the present invention allows a user to visibly displaying the inserted cue-point and to easily divide and edit sections of the video with this.

In addition, the video provider can use two techniques for editing sections of a video using the said method. The first technique is to insert as many cue-points as possible to the video and to divide the video into fine section so that a user can enter a reply at an exact point of time in the video corresponding to the reply whenever the user writes the replay anytime while playing the video; the second technique to divide the video into non-periodical sections so that a user watches the divided sections of the video other than the entire video and writes a reply.

In addition, the video provider (400) writes and inserts a script for each section of the video in the editing process. The said script is made by the video provider and the content of the script includes simple title describing the type of the section according to the criteria used in editing the sections of the video (e.g. kiss scene, farewell scene, and etc.), simple or detailed explanation for the content of the corresponding section, explanation for the position of the corresponding section (e.g. the third section of a video having 10 sections is represented by $3/10$), and keywords such as main dialogue in the corresponding section. In addition, after providing the video, replies from users and a summary of diverse opinions made with other methods can be added. The information made by users can be given by the form of statistical information but users identify the corresponding section firstly by reading the script.

Figure 3:
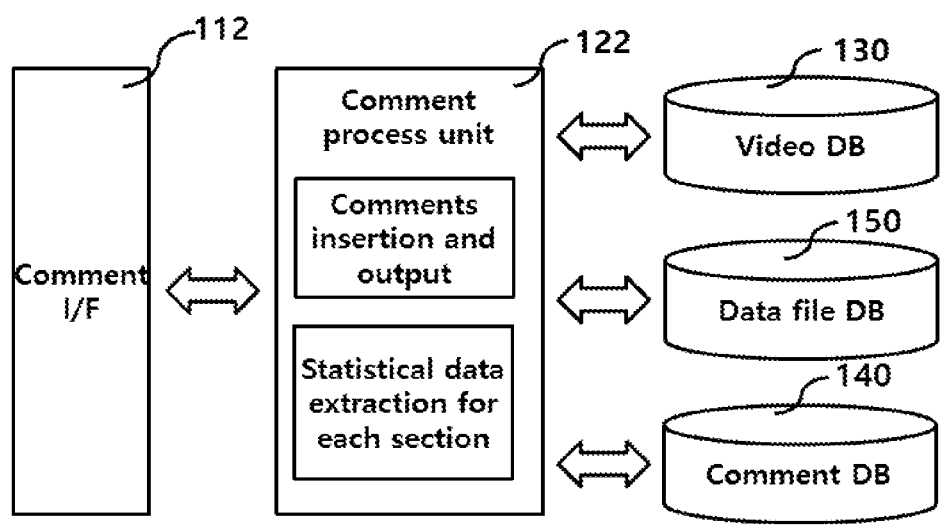
FIG. 3 is an exemplary diagram for explaining the functions provided by the reply interface of an apparatus of providing comments and statistical information for each section of a video content in accordance with an embodiment of the present invention.

FIG. 3 is an exemplary diagram for explaining the functions provided by the reply interface of an apparatus of providing comments and statistical information for each section of a video content in accordance with an embodiment of the present invention.

As shown in FIG. 3, the said reply interface (112) receives the user's replies for the entire video content and a specific section of the video at the same time through the reply processing part (122) and displays the received replies for users to see. The input process is as follows: if the user activates the reply interface (112) while playing the original video by accessing it with the data file and write a reply, the reply processing part (122) saves retrieves the video section information containing the reply input time from the data file and then saves it with the above reply content together.

On the other hand, during the playback of the video the user writes a reply and then selects whether the reply refers to the entire video contents or the section of present playback time; if the user select the entire video, the corresponding reply is set up as a reply for the entire video; if the user select the section of the video, the corresponding reply is set up as a reply for the current section. The start time of playback for the section to which the reply is attached depends on the time scale of the edited section: if the video provider uses a fine time scale, then the start time of section is close to the starting time for the reply; if the video provider uses a coarse time scale, then the start time section is earlier than the starting time for the reply.

In addition, users can write a reply to the reply posted by another user watching the said video. In addition, users can write a reply at any time while watching the entire video as described above or users can write a reply for a specific section while watching the section of the video divided by the video producer beforehand.

When a user inputs a reply as described above, the content of corresponding reply and the video section information at the time of writing the reply retrieved from the data file are saved together; the process will be described in detail with reference to FIG. 5.

On the other hand, the said reply interface (112) provides statistical information for each section of a video content based on the reply information in the reply database (140) with the reply processing part (122). The said reply processing part (122) provides users with a script including simple explanation for each section of the video, content of reply for each section of the video, various comment for each section of video written by users in addition to the reply, and statistical information extracted from the said reply for each section and the said comment in a display in which the video provider presents the edited video by sections to users. Typically the corresponding section information is displayed by thumbnail images but the thumbnail image is not enough for users to provide the characteristics of the content of the section so that it is necessary to use information such as the above script, statistical information, and reply etc.

On the other hand, a method of displaying the content of reply for each section of the video can use to sort replies according to the voting including pros and cons for each reply as usual so that a reply with the larger number of recommendations is placed at the top of the reply display window; or replies are displayed separately according to pros and cons.

In addition to the said reply, various comment from users for the corresponding section of the video are written by specified tools different from the tool for reply to write freely various opinions and includes information gathered by user's vote such as number of stars or score assessing the corresponding section of the video, 'like' or 'dislike' of YouTube, number of read for the corresponding section, and etc.; in addition to the said items various methods can be used to get the comments from users.

The said statistical information includes various statistics of reply and extracted statistical information by connecting the reply and the various comments, and is provided in different ways. For example, in case of drama the statistics such as the number of replies for each drama, the number of replies for each episode of a drama, the number of replies for each section of each episode can be provided to allow identifying what part of what drama is interesting to users; or the grade computed by score, voting result of 'like' and 'dislike', and the content of reply is provided as information on the popularity of each section of the video. For reference, the method of providing users with statistical information is not limited to the method exemplified above but may be multifarious depending on the service provider, video provider, and the type of video contents.

In addition, the method of displaying the said statistical information can use text type and graph type together for users so as to intuitively identify the sections of the video and play the wanted parts (or sections) of the video.

Figure 4:
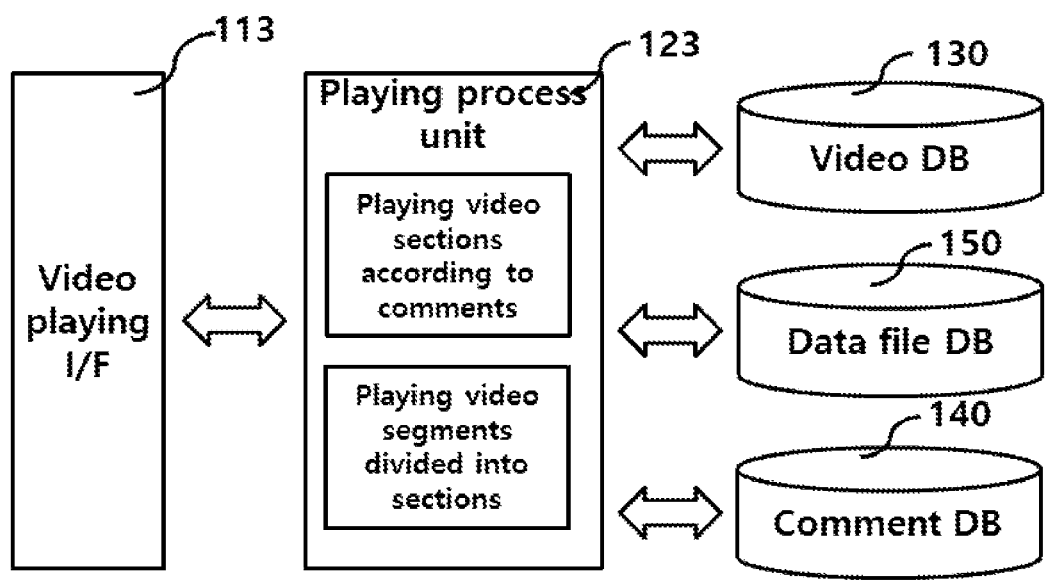
FIG. 4 is an exemplary diagram for explaining the functions provided by the video contents playback interface of an apparatus of providing comments and statistical information for each section of a video content in accordance with an embodiment of the present invention.

FIG. 4 is an exemplary diagram for explaining the functions provided by the video contents playback interface of an apparatus of providing comments and statistical information for each section of a video content in accordance with an embodiment of the present invention.

As shown in FIG. 4, the video playback interface (113) provides users with a function for allowing to access a video contents section by section and play the respective sections; enables users to select a reply of the video and to play the section containing the time at which the reply is posted; or plays the video divided by sections by the video contents provider from the start. Firstly each section of the video is played with the original video file stored in the video database (130) by accessing the data file in the data file database (150); playing the sections of the video according to the reply are played with the original video file stored in the video database (130) by using the reply information stored in the reply database (140) and the reply file consisting of section information instead of using the said data file.

Hereinafter, the method of saving and collecting replies for each section of a video and providing users with statistical data in the apparatus of providing comments and statistical information for each section of a video content in accordance with an embodiment of the present invention will be described with reference to the accompanying figures.

Figure 5:
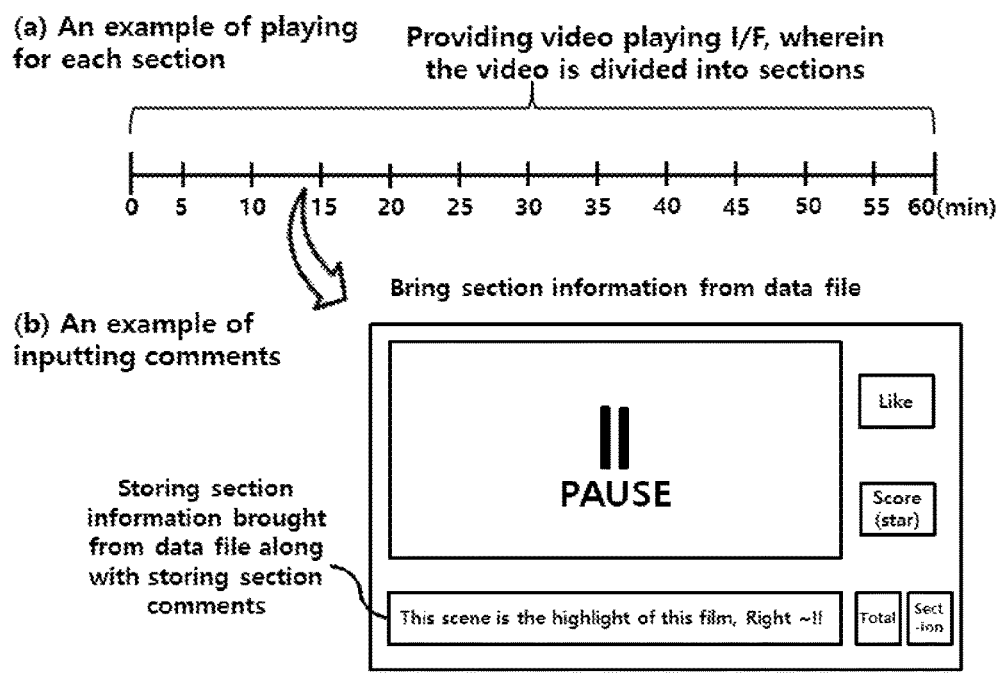
FIG. 5 is an exemplary diagram for illustrating writing and saving replies for each section of the video in accordance with an embodiment of the present invention.

FIG. 5 is an exemplary diagram for illustrating writing and saving replies for each section of the video in accordance with an embodiment of the present invention.

As shown in FIG. 5, the reply statistical information provision device for each section of the video (100) provides an interface playing the video divided by sections with the video playback interface (113). As described above, the video divided by sections is not edited section by section but contains the original video file and the data file containing cue-points and section grouping information. That is the playback of the original video file is controlled by executing the data file containing the grouping information for each section of the video.

If the user activates the reply interface (112) while playing the video or selects and plays specific sections in the playback interface for the video divided by sections, the playback of the video is converted into pause mode to identify the exact reply input time and the section information containing the reply input time is retrieved from the data file. The activated reply interface (112) as described above comprises at least one of the method of writing a reply and then selecting whether the reply refers to the whole video contents or the present playback time, and the method of voting 'score' or 'like.' After the user writes a reply and saves it, the corresponding reply content is saved with the section information of the said data file. At the same time, 'score' and 'like vote results can be saved in the same way. As described above, since the reply content is saved together only with the section information of the data file, other users can play the corresponding sections of the video using the section information saved with the reply without the data file. Otherwise saving the reply information in the said data file may be used also.

On the other hand, the reply interface can be activated by the Seekbar that displays user opinion such as the number of replies and likes at a glance in the lower part of playback screen. The said Seekbar is in the form of video divided by sections and displays different height for each section of the video by the number of user opinion such as the number of replies or scores for users so as to easily identify the main parts of the video. The length of the Seekbar can be variously adjusted by the length of video playback time and it can exceed the length of the screen. In this case the Seekbar is displayed in the screen as moving according to the video playback speed and the user can display the unseen part of Seekbar in the screen by dragging the Seekbar. In addition, during the video playback the newest replies for the corresponding section of the video are displayed as the playback section of Seekbar is moved; when the user selects a specific section, the user identifies all the replies for that section. In addition, when the user select a specific section, the reply input interface for that section is activated and the user can write a reply and express his opinion such as like in addition to the reply.

Figure 6:
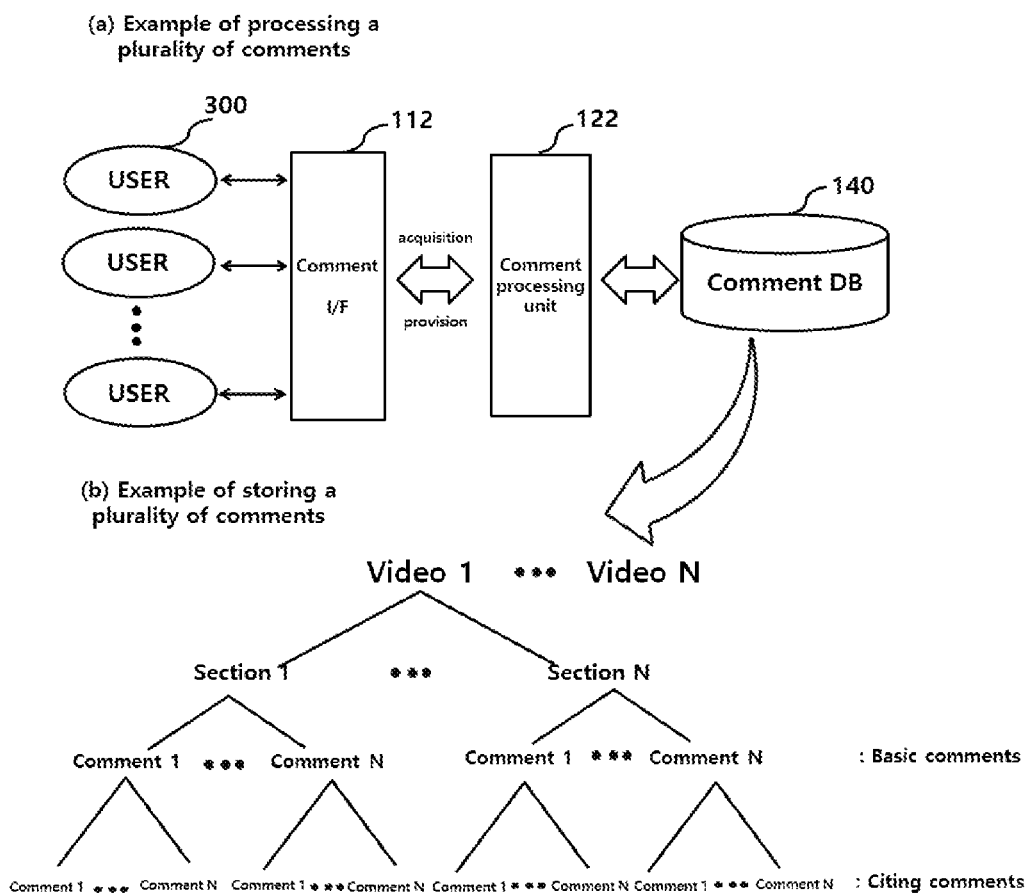
FIG. 6 is an exemplary diagram for illustrating the method of processing and saving multiple replies in accordance with an embodiment of the present invention.

FIG. 6 is an exemplary diagram for illustrating the method of processing and saving multiple replies in accordance with an embodiment of the present invention.

Because of the reply system, as time goes by, the number of replies many users write is increasing and the size of section information from the data file and the size of reply file containing this section information are also increasing. To prevent the increase of these files, the present invention uses an efficient method to process a large number of replies as shown in FIG. 6.

The reply processing part (122) collects the reply information received from multiple users (300) with the said reply interface (112) and makes the reply file containing section information of the video; for the efficiency of the system, the said reply processing part (122) makes a reply file of multiple replies for the same section of the video and saves it to the reply database (140) instead of making a reply file for each reply. In addition, when a new reply for the same section of the video is inputted by another user, the integrated processing part (120) adds and saves the said new reply information to the reply file for the corresponding section.

That is, as shown in FIG. 6b, the method of saving the reply file uses a tree structure in which replies for the same section are saved together and the replies citing a basic reply are saved subject to the basic reply when the citing replies are inputted afterwards. By using the method of saving a reply file, a number of replies can be saved systematically and efficiently and effective statistical information can be extracted to efficiently identify the total number of replies for a specific video among N videos, a specific section and citing replies of a specific reply.

Figure 7:
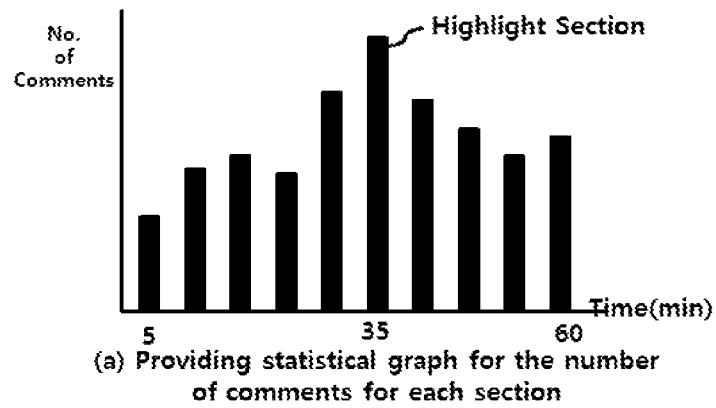
FIG. 7 is an exemplary diagram for explaining the method of providing users with reply statistical information for each section in accordance with an embodiment of the present invention.
Figure 7:
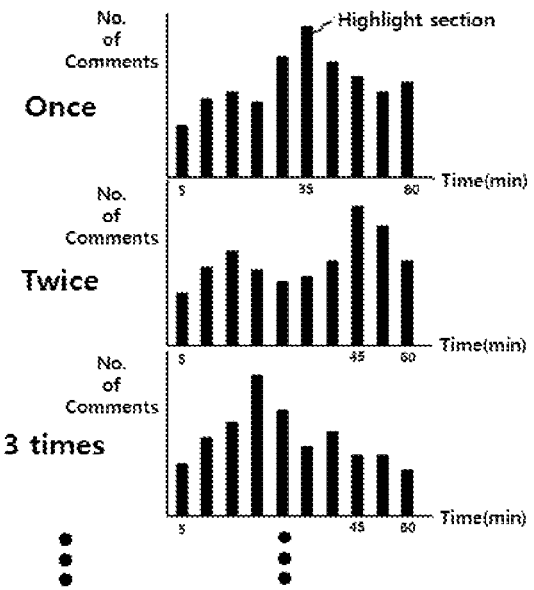
Figure 7:
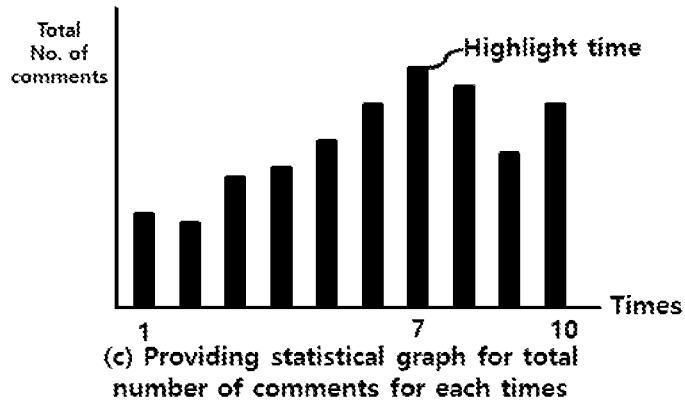

FIG. 7 is an exemplary diagram for explaining the method of providing users with reply statistical information for each section in accordance with an embodiment of the present invention.

As shown in FIG. 7, by providing a graph in which the horizontal axis is the playback time of the video and the vertical axis is the number of replies for each section with the device of providing reply statistical information for each section of a video (100), it is possible to understand the degree of interest on each section of the video at a glance. Using a graph is a typical statistical information provisioning method to allow users to identify the highlighted sections of the video intuitively and fast without analyzing the data. In addition, users can understand the video of length 60 minutes in 5 minutes by playing important sections like the highlighted parts and changing the vertical axis with various values other than the number of replies allows users to search their wanted sections of the video multifariously.

In addition, it is possible to provide a statistical graph for multiple videos. For example, for a drama consisting of 10 episodes, the number of replies for each section of each episode may be provided to users in order to watch only highlighted part of each episode so that the users can watch 600 minute of episodes of a drama in less than 60 minutes. In addition, if a statistical graph on the total number of replies for each episode a drama is provided, users can find important episodes among all the episodes of the drama and also users can enjoy watching the drama with minimum effort and time by watching the entire length for the important episodes and watching the highlighted parts for less important episodes.

In addition, the method of providing users with statistical information is not limited to the method of providing the total number of replies for each episode of the same drama but may be used to provide diverse information such as the number of replies for each section of dramas played on Monday and etc. according to the target users.

Figure 8:
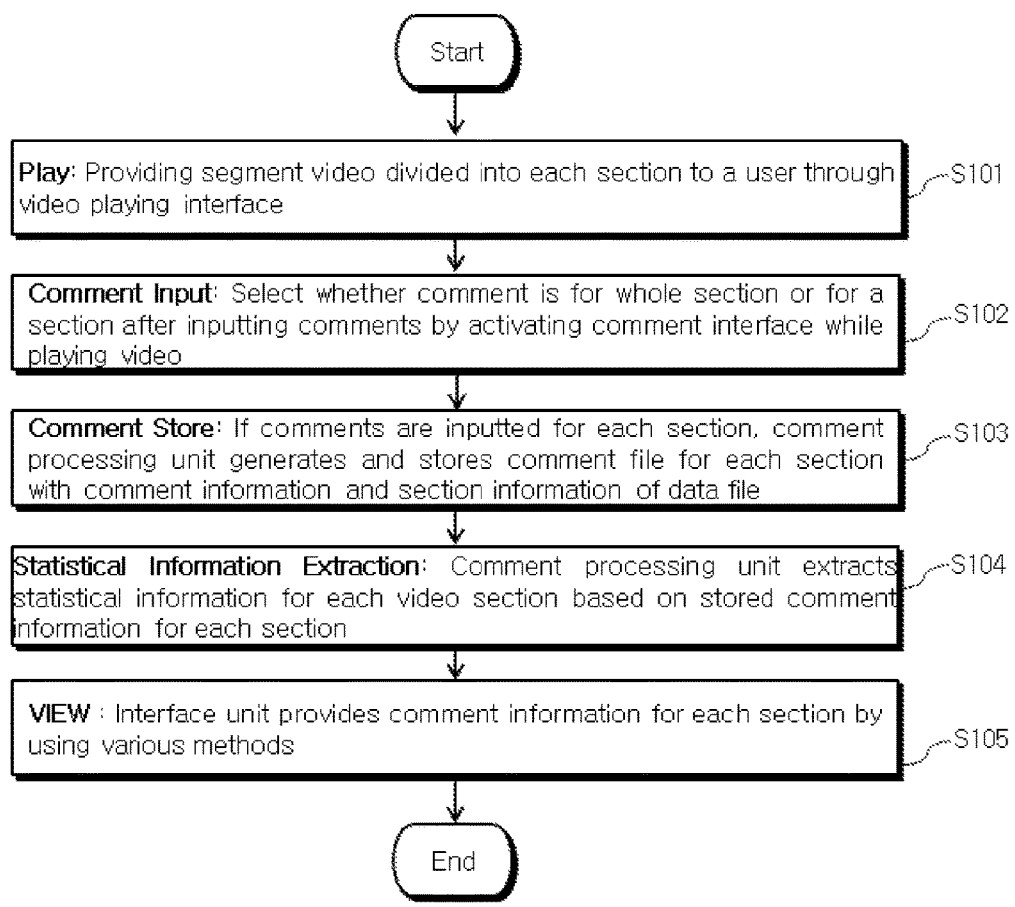
FIG. 8 is a flow chart for explaining the method of providing reply statistical information for each section in accordance with an embodiment of the present invention.

FIG. 8 is a flow chart for explaining the method of providing reply statistical information for each section in accordance with an embodiment of the present invention.

As shown in FIG. 8, the method of providing reply statistical information for each section proceeds in order playback each section of the video divided by sections, reply writing, reply save, statistical information extraction, and view (View).

First the video divided by sections is provided to the user with the video playback interface (S101). The user activates the reply interface during the playback of the video divided by sections, writes a reply and then selects whether the reply refers to the whole video contents or the present playback time (S102). After writing the reply described above, the reply processing part generates a reply file for each section of the video by reading the input reply and the video section information at the time of writing the input reply and saves it in the reply database (S103). The reply processing part extracts statistical information for each section of the video based on the video reply information saved (S104) and provides users by displaying the said statistical information for each section of the video in various ways in the interface part (S105).

The present invention has been described above with reference to an embodiment shown in the figures, which is exemplificative only and the various and equivalent embodiments are possible by those who have ordinary knowledge in the area the present invention belongs to. Therefore, the technical scope of the present invention will be determined by the claims below.

What is claimed is:

1. An apparatus of providing comments and statistical information for a video contents having a plurality of sections, the apparatus comprising:
   an interface for providing comments and statistical information for each section of said video contents, wherein said interface comprises a comment interface and at least one selected from the group consisting of a video editing interface and a video playing interface;
   an integrated processing unit for performing a process for providing comments and statistical information for each section of a video contents, wherein said process comprises a comment process and at least one selected from the group consisting of an editing process and a playing process, wherein said comments process saves comments using a tree structure in which comments for the same section of said plurality of sections of said video contents are saved as basic comments in the same file and a comment citing a basic comment is saved as a citing comment in the same file in which the cited basic comment is saved; and
   a database,
   wherein the apparatus enables to selectively write comments for one section of said plurality of sections of said video contents relative to another section of said plurality of sections of said video contents, and to provide the statistical information for the comments to identify a total number of citing comments for a section of said plurality of sections of said video contents, so that users can search and play a specific section of said plurality of sections of said video contents.

2. The apparatus of claim 1, wherein said database comprises:
   a video database;
   a data file database; and
   a comment database, wherein said database utilizes at least one selected from the group consisting of an internal storage, an external storage, a network storage, and a virtualized storage of cloud computing network connected to network.

3. The apparatus of claim 1, wherein each section of said plurality of sections of said video contents comprises a data file storing specific editing information in addition to a source video file, so that said video file is played by referring said data file.

4. The apparatus of claim 1, wherein said interface comprises said video editing interface and wherein said editing process generates a data file comprising at least one selected from the group consisting of cue point insertion information, section grouping information, scripts comprising a description for each section of said plurality of sections of said video contents, or the combinations thereof.

5. The apparatus of claim 1, wherein said interface comprises said comment interface and wherein said comment process inserts and outputs a comment for the one section of said plurality of sections of said video contents, and extracts and provides the statistical information for the one section of said plurality of sections of said video contents.

6. The apparatus of claim 1, wherein said interface comprises said video playing interface and wherein said playing process plays at least one selected from the group consisting of said video contents, and the one section of said plurality of sections of said video contents corresponding to said comments.

7. A method for providing for comments and statistical information for a video contents having a plurality of sections, the method comprising:
receiving comments for one section of the plurality of sections of said video contents as input;
saving comments using a tree structure in which comments for the same section of said plurality of sections of said video contents as basic comments in the same file and saving a comment citing a basic comment as a citing comment in the same file in which the cited basic comment is saved;
processing said comments and statistical information for the one section of the plurality of sections of said video contents to identify a total number of citing comments for a section of said plurality of sections of said video contents;
outputting said comments and statistical information for the one section of the plurality of sections of said video contents; and
storing processed results in at least one of databases;
wherein the method enables to write comments for one section of said plurality of sections of said video contents relative to another section of said plurality of sections of said video contents, and to provide the statistical information for the comments, so that users can search and play a specific section of said video contents.

8. The method of claim 7, the method further comprising:
playing for each section of said video.

9. The method of claim 7, wherein said database comprises:
a video database;
a data file database; and
a comment database;
wherein said database utilizes at least one selected from the group consisting of an internal storage, an external storage, a network storage, and a virtualized storage of cloud computing network connected to network.

10. The method of claim 7, wherein said each section of said plurality of sections of video contents comprises a data file storing specific editing information in addition to a source video file, so that said video file is played by referring said data file.

11. The method of claim 10, wherein said data file comprises at least one selected from the group consisting of cue point insertion information, section grouping information, and scripts comprising a description for each section of said video.

* * * * *